United States Patent [19]

Little

[11] 4,325,079

[45] Apr. 13, 1982

[54] SECURE VIDEO TRANSMISSION SYSTEM

[76] Inventor: William D. Little, 3548 Townsend Dr., Dallas, Tex. 75229

[21] Appl. No.: 157,790

[22] Filed: Jun. 9, 1980

[51] Int. Cl.³ .............................................. H04N 7/16
[52] U.S. Cl. .................................... 358/120; 358/114
[58] Field of Search ................................ 358/120, 114

[56] References Cited

U.S. PATENT DOCUMENTS

| | | | |
|---|---|---|---|
| 3,116,363 | 12/1963 | Doundoulakis | 358/120 |
| 3,184,537 | 5/1965 | Court et al. | 358/120 |
| 3,485,941 | 12/1969 | Bass | 358/120 |
| 3,963,865 | 6/1976 | Songer | 358/120 |

Primary Examiner—S. C. Buczinski
Attorney, Agent, or Firm—Dennis T. Griggs

[57] ABSTRACT

A video transmission and receiving system provides continuous surveillance over a predetermined area in which video information is secured in such a manner that it cannot be intercepted by conventional television receivers. In the video transmission portion of the system, the pulse width of vertical synchronization pulses which occur during the vertical blanking interval are deliberately narrowed in duration, preferably equal in width to the equalization pulses which precede and follow the vertical pulse train, and which have an amplitude which is detectably greater than the amplitude of the horizontal synchronizing pulses and equalizing pulses. The narrow vertical pulses occur at the same frequency as the equalizing pulses and are separated from the horizontal synchronizing pulses by amplitude clipping instead of by waveform separation. The relatively high amplitude, relatively narrow width vertical synchronizing pulses are not detectable by the waveform integrating circuit of a conventional receiver since the interval between successive vertical synchronizing pulses is substantially greater than the vertical pulse duration.

4 Claims, 4 Drawing Figures

SECURE VIDEO TRANSMISSION SYSTEM

BACKGROUND OF THE INVENTION

1. Field of the Invention:

The claimed invention relates generally to surveillance systems, and in particular to an electronic video transmission system for providing continuous surveillance over a predetermined area in which video information is secured in such a manner that it cannot be detected by conventional television receivers.

2. Description of the Prior Art:

The business need for surveillance of business and industrial operations is well established. Visual observation by security personnel is commonly employed for a business as well as security purposes. Surveillance is needed to monitor the presence of unauthorized persons, to monitor the whereabouts of employees entering and leaving, employee performance and efficiency, to determine the existence of fires or other unsafe conditions, to detect theft of equipment or goods through rear doors of an establishment, and to monitor the activities of delivery personnel.

The degrees of security and level of surveillance may vary from building to building or from area to area within a large building. For example, security is required for business operations in which a product is being manufactured according to a proprietary technique which is maintained as a trade secret. In addition, government contractors may from time to time engage in the manufacture of equipment which must be maintained confidential or secret. Certain records maintained by banks and security dealers likewise require a high degree of security. Thus there are a number of operations in which the security of surveillance as well as general security is of paramount importance.

A widely used method for providing continuous surveillance over a predetermined area is by video transmission. The most elemental video surveillance system consists of a single camera permanently connected to a video monitor through a closed circuit transmission line. The transmission of surveillance information through the closed circuit transmission line is relatively secure and immune from unauthorized reception. However, the closed circuit video transmission arrangement cannot be used for certain applications in which it is impossible or not practical to install a closed circuit transmission line. In some instances, it is important to conceal the existence of the surveillance equipment so that surveillance can be performed without the knowledge of personnel within the area. In such situations it is desirable, of course, to miniaturize the equipment used, to conceal it from view, and to make it easy to install and remove so that it can be rapidly removed and set up in different locations from time to time.

A wireless video transmission system satisfies the requirements for area surveillance and miniaturized equipment is available which is easily concealed and which is easy to set up and remove. However, a video transmission signal transmitted over a portion of the frequency spectrum allocated to television broadcasting is subject to interception and monitoring by unauthorized persons through an ordinary television receiver. A conventional method for disguising or concealing the surveillance information which is carried by the video signal is to encode the video data on a line-for-line basis and decode it in a modified video receiver. However, such a complex arrangement requires elaborate data processing equipment for both the transmitter and the receiver, and requires a relatively large amount of power for transmission. Such arrangements are not compatible with battery powered miniaturized equipment in which it may be desirable to operate for an extended period on a limited capacity battery.

OBJECTS OF THE INVENTION

It is, therefore, the principal object of the present invention to provide a secure, wireless video transmission system for area surveillance.

Yet another object of the invention is to provide a video transmission and receiving system in which surveillance information can be transmitted by means of either a UHF or VHF video signal which carries synchronizing information to which conventional television receivers are not responsive.

A further object of the invention is to provide a secure video transmission system having minimum average power requirements.

SUMMARY OF THE INVENTION

The foregoing objects are achieved in a video transmission and receiving system in which the pulse width of vertical synchronization pulses which occur during the retrace portion of the horizontal sweep are deliberately narrowed in duration, preferably equal in width to the equalization pulses which precede and follow the vertical pulse train, and which have an amplitude which is detectably greater than the amplitude of the horizontal synchronizing pulses and equalizing pulses. The narrow vertical sync pulses occur at the same frequency as the equalizing pulses and are separated from the horizontal synchronizing pulses by amplitude clipping instead of by waveform separation. The relatively high amplitude, relatively narrow width vertical synchronizing pulses are not detectable by the waveform integrating circuit of a conventional receiver since the interval between successive vertical synchronizing pulses is substantially greater than the duration of each vertical synchronizing pulse. According to this arrangement, because the duration of the vertical synchronizing pulse is small as compared to the interval between the vertical pulses, the output of the integrator of a conventional video receiver will rise momentarily for the duration of each vertical synchronizing pulse but will rapidly drop to its original value between pulses, and thus will fail to achieve the minimum amplitude level required for synchronization.

In the receiver of the secure video transmission system, the horizontal and vertical synchronization signals are separated from the video signal by clipping. The horizontal synchronization signals are conventional and are separated from the clipped pulse train by a conventional high pass filter or differentiating circuit. The vertical synchronization pulses are separated from the clipped pulse train by a second clipper stage which is responsive only to the relatively high amplitude of the vertical synchronization pulses. The output of the second stage clipper is averaged in an envelope detector or the like which provides a broad synchronization pulse for triggering the vertical sweep generator of the video receiver.

According to this arrangement, the average power requirements are substantially the same as or slightly less than that of a conventional video transmission system since the duration of each vertical synchronizing pulse is relatively small as compared to the conventional broad vertical synchronizing pulses. Because the relatively narrow, high amplitude vertical synchronization pulses occur at the same frequency as standard vertical synchronization pulses, this arrangement has no adverse effect upon horizontal synchronization. But most importantly, the modified vertical synchronization pulses as provided by the invention are not detectable by the waveform separation circuits of conventional television receivers, so that video surveillance information can be transmitted at UHF or VHF frequencies without risk of interception and monitoring by unauthorized persons.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

DESCRIPTION OF A PREFERRED EMBODIMENT

Figure 1:
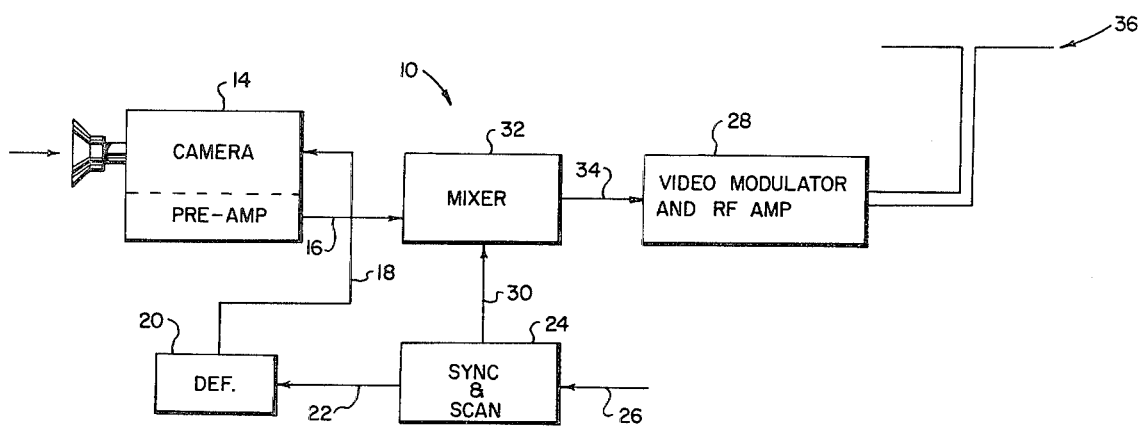
FIG. 1 is a block diagram of a wireless video transmitter.

In a description which follows, like parts are marked throughout the specification and drawing with the same reference numerals, respectively. The drawings are not necessarily to scale and in some instances portions have been exaggerated in order to more clearly depict certain features of the invention.

The best mode presently contemplated for practicing the invention is in a wireless video transmission system. However, the secure signal transmission technique can be used to good advantage in combination with a closed circuit video transmission and monitoring system, for example of the type commonly referred to as cable T.V. systems, in order to prevent interception by unauthorized persons.

Figure 2:
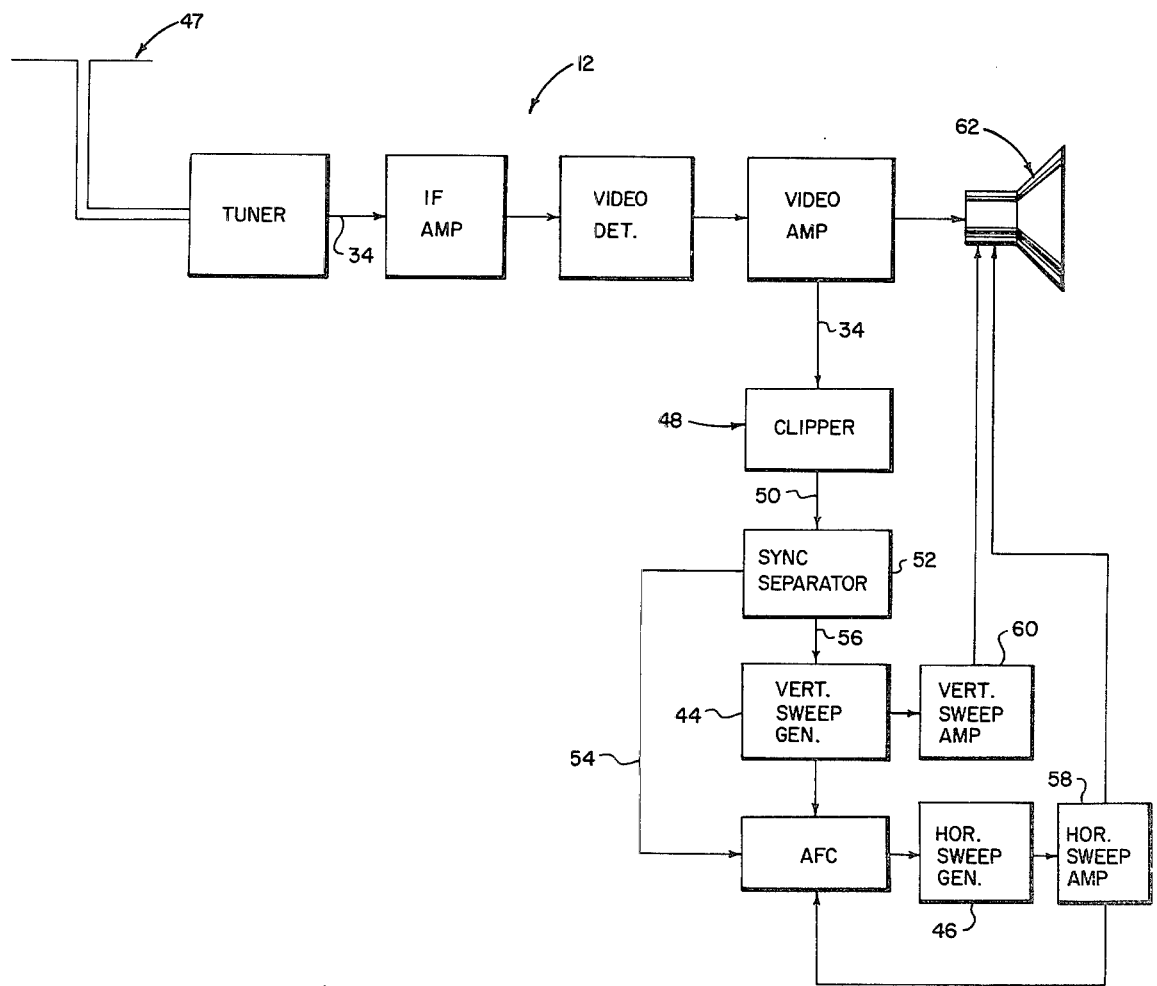
FIG. 2 is a block diagram of a video receiver.

Referring to FIGS. 1 and 2, a video transmitter is indicated generally at 10 in FIG. 1, and a video receiver is indicated generally at 12 in FIG. 2. In the video transmitter 10, a video camera 14 is provided for observing a given field of view. The video transmitter 10 amplitude modulates a video signal having approximately a six megacycle band width and transmitted at, for example, UHF frequencies to the receiver 12. The transmission frequency is preferably in the upper end of the UHF band, whereby the transmitted band width is very narrow and is beamed directly to the video receiver. For narrow beam widths at UHF frequencies, ten milliwatts of RF will provide approximately two miles range with sufficient signal-to-noise ratio. Higher power levels may be used as desired. The video transmitter 10 runs on a continuous basis providing video information to the receiver 12. A number of video transmitters 10 can be installed at different remote sites and can transmit to the video receiver 12 on the frequency on a time sharing basis, or can transmit at different frequencies which are selectively scanned by the video receiver 12.

The area under surveillance is scanned by the camera 14 by a beam of electrons in a series of adjacent horizontal lines. The frequency at which a complete picture scanned is the frame frequency and is thirty times per second. Interlaced scanning is utilized in the usual manner at a field frequency of twice the frame frequency. Two fields are produced in order to make one complete picture or frame. The field frequency is sixty fields per second and the frame frequency is thirty frames per second. Each field contains one-half of the total picture elements.

The camera 14 is preferably of the vidicon type having a transparent conducting film target on the inner surface of a face plate and a thin photoconductive layer deposited on the film. When the photoconductive layer is scanned by an electron beam, this action produces a change in the difference of potential between the two surfaces of the element being scanned. The two surfaces of the element being scanned constitutes a charge capacitor and when connected through an external signal electrode circuit and a scanning beam, a current is produced which constitutes a video signal 16. The camera 14 is driven by the output 18 of a deflector circuit 20 in response to a scan signal 22 developed by a sync and scan circuit 24. The scanning frequency is derived from an external standard reference signal 26, for example the 60 Hz power line frequency.

The television camera 14 converts the area being scanned into electrical impulses comprising the video signal 16 which are amplified by a video modulator and RF amplifier circuit 28. In order to keep the scene in the receiver in step with the scene at the transmitter, a synchronizing signal 30, which is developed by the sync and scan circuit 24, is combined with the video signal 16 in a mixer circuit 32 prior to undergoing modulation and RF amplification. The output of the mixer 32 is a composite video signal 34 which includes horizontal and vertical synchronizing pulses as well as the video information. The composite video signal 34 is amplitude modulated and amplified at a selected UHF or VHF frequency for radiation by an antenna 36.

If anything other than a complete blur is to be obtained at the receiver, it is necessary that the number of lines per frame, the order of scanning the lines, and the number of frames per second be identical at the receiver and the transmitter. Also, identical synchronization pulses must be provided for the sweep circuits of the camera tube and at a picture tube in the receiver so that the electron beams of both tubes will have the same relative position at any given instant. Synchronization is assured by the composite sync signal 30 which includes both horizontal and vertical sync information.

Figure 3:
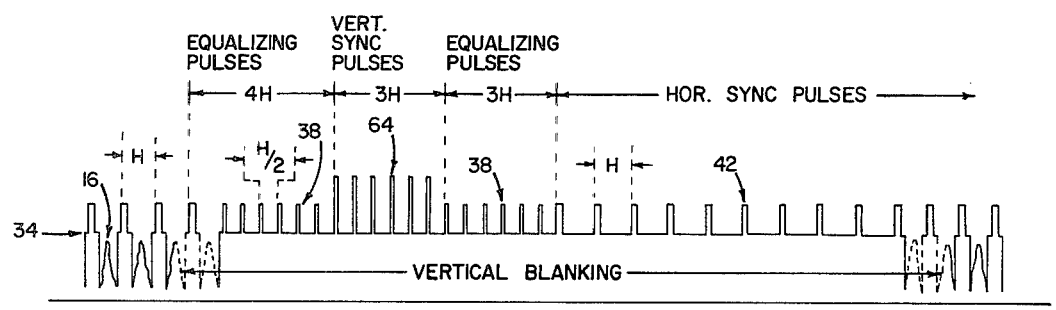
FIG. 3 is a graphical representation of a portion of a video signal including the synchronizing wave forms.
Figure 4:
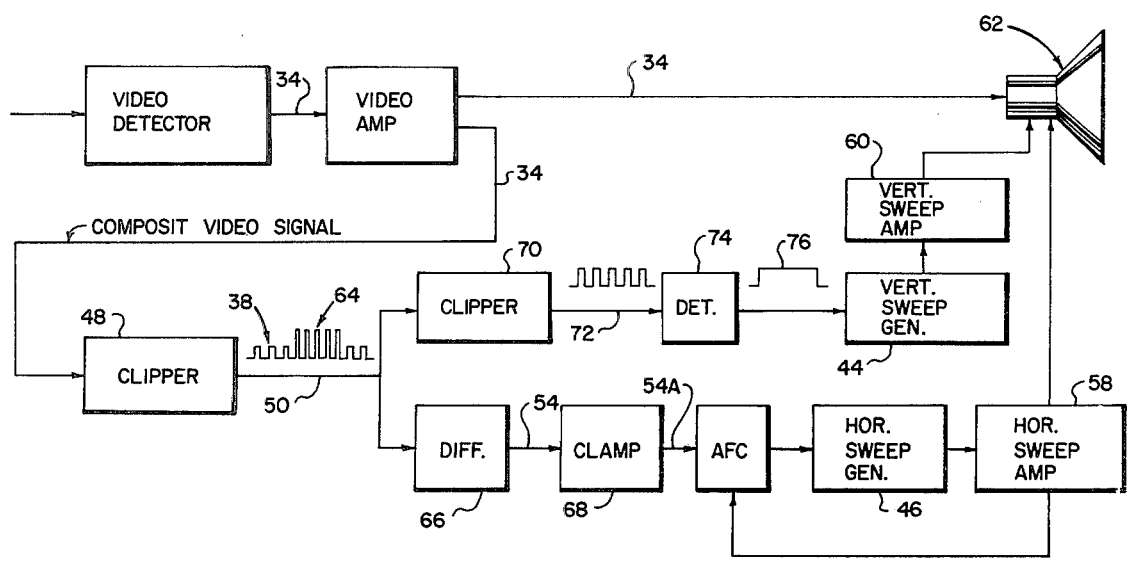
FIG. 4 is a block diagram of a portion of a video receiver which illustrates the wave form separation of the invention.

The horizontal and vertical synchronization information is transmitted in the form of a pulse chain as illustrated in FIGS. 3 and 4. The impulses are formed by a chain of suitable pulse oscillators and shaping circuits. These impulses are added together and to the video signal by means of keying or mixing circuits within the mixer 32. The pulse forming and shaping system employs multivibrators, limiting amplifiers, addition networks and keying stages to produce three types of pulses: equalization pulses 38, vertical sync pulses and horizontal sync pulses 42. The duration of the broad vertical pulses 40 is 27.3 microseconds, as compared to 5.08 microsecond duration for the horizontal synchronizing pulses. The equalizing pulses 38 are half as wide as the horizontal synchronizing pulses, with a duration of 2.54 microseconds. The foregoing pulse widths are conventional and are illustrated in FIG. 3.

The interval between the leading edge of one horizontal synchronizing pulse and the leading edge of the next horizontal synchronizing pulse is 1H or 63.5 microseconds. "H" represents the time required for one complete cycle of the horizontal sweep. At the completion of the last visible line of each field, a series of six equalizing pulses 38 are transmitted, followed by a series of six broad vertical sync pulses, which are followed by six more equalizing pulses 38. During the transmission of these pulses, the amplitude of the video signal is such as to be always in the black region whereby the spot on the CRT is invisible.

The purpose of the six broad pulses of the conventional vertical pulse group is to time or initiate the start of the retrace of the vertical sweep generator 44 and move the spot from the bottom of the screen to the top. In order to maintain horizontal line synchronization during this period, the vertical pulse is divided into six separate pulses, the leading edge of every other one being separated by 1H or 63.5 microseconds so that it will initiate horizontal retrace at 1H intervals. The equalizing pulses maintain horizontal synchronization immediately preceeding and following the vertical synchronizing pulse interval, since the leading edge of every other one is spaced 1H. If this were the only consideration, ordinary horizontal synchronizing pulses could be used, but in order to have identical conditions preceeding and following the vertical synchronizing pulses for successive fields so that perfect interlacing will occur, smaller pulses are used which are separated by 0.5H instead of the 1H separation used with horizontal synchronizing pulses. A number of the horizontal synchronizing pulses 42 follow the second set of equalizing pulses 38 so that the horizontal sweep generator 46 in the receiver 12 will be properly timed when the vertical blanking is removed at the top of the picture.

The vertical, horizontal and equalizing pulses have the same amplitude according to conventional synchronizing techniques as shown in FIG. 4. However, their duration or width is not the same. The duration of the horizontal synchronizing pulse is 5.08 microseconds while that of each vertical synchronizing pulse is considerably longer, being 27.3 microseconds. The reason for this difference in width between the two pulses is to provide for their separation in a conventional receiver by the waveform method of separation.

The transmitted video signal is received by a receiving antenna 47 and is detected and amplified in the usual tuner, I.F. and video amplifier stages. According to the conventional waveform method of separation, the synchronizing pulses are separated from the video information to prevent the video information from interfering with the synchronizing operation. Referring to FIG. 2, this is accomplished in the receiver by a clipper circuit 48 which will pass only the top twenty-five percent of the composite video signal in which the synchronizing pulses are contained. The output of the clipper is a composite synchronizing signal 50 which comprises the equalizing pulses, the vertical sync pulses and the horizontal sync pulses.

According to the conventional waveform method of separation, the composite synchronizing signal 50 is fed into a sync separator 52 which includes a low pass filter or integrating circuit which separates the long duration or low frequency vertical pulses from the short duration or high frequency horizontal pulses 42 and equalizing pulses 38. The composite sync signal 50 is also fed through a high pass filter or differentiating circuit within the sync separator 52 which converts the leading edge of every synchronizing pulse, whether it be horizontal, equalizing or vertical, into voltage pulses 54 which time the horizontal sweep generator 46. The integrating circuit of the sync separator 52 converts the six broad vertical pulses into an integrated vertical pulse 56 having an amplitude which exceeds the level required to trigger sweep generator 44. The differentiated horizontal pulses 54 and the integrated vertical pulses 56 are fed through sweep amplifiers 58,60, respectively, for driving a CRT 62.

It should be noted that the success of the conventional synchronizing scheme depends upon vertical and horizontal pulse groups which can be distinguished electrically, by the waveform method of separation in which the broad vertical sync pulses are separated by low pass integration.

In order to secure the transmission of video information, the standard synchronization system is altered in the present invention by generating vertical sync pulses 64 in the sync generating circuit 24 of the transmitter which have relatively narrow width and relatively greater amplitude as compared with the conventional vertical pulses. The width of the vertical sync pulses 64 are preferably equal in width to the equalization pulses which preceed and follow the vertical pulse train and have an amplitude (2A) which is preferably twice the amplitude of the horizontal and synchronizing pulses and equalizing pulses (1A). The narrow vertical sync pulses 64 occur at the same frequency as the equalizing pulses so that this arrangement has no adverse effect upon horizontal synchronization.

Referring now to FIG. 4, the composite sync signal 50 is fed through a differentiating circuit 66 wherein the differentiated horizontal pulses 54 are produced. The horizontal pulse signals 54 are clamped in a clamping circuit 68 to produce the horizontal sync signal 54A. This signal then drives the horizontal sweep generator 46 and horizontal sweep amplifier 58 in the manner previously discussed.

The composite sync signal 50 is also fed through a second clipper 70 which is responsive only to the relatively high amplitude of the vertical synchronizing pulses 64. The vertical pulses 72 which are carried in the output of the clipper 70 are averaged in an envelope detector 74 which provides a broad synchronization pulse 76 having an amplitude which exceeds the level required to trigger the vertical sweep generator 44.

According to this arrangement, the average power requirements for video and synchronizing signal transmission are substantially the same as or slightly less than that of a conventional video transmission system since the duration of each vertical synchronizing pulse 64 is relatively small as compared to conventional broad vertical synchronizing pulses. Because the duration of each vertical synchronizing pulse 64 is small as compared to the interval between the vertical pulses, the output of the integrator of a conventional video receiver will rise momentarily for the duration of each vertical synchronizing pulse but will rapidly drop to its original value between pulses since the interval between successive vertical synchronizing pulses is substantially greater than the duration of each vertical synchronizing pulse. Thus the integrator of the conventional video receiver will fail to achieve the minimum amplitude level required for synchronization, wherein the vertical sweep generator will not be triggered, with the result that the surveillance information displayed by a conventional receiver will not be intelligible. This allows the video surveillance information to be transmitted at UHF or VHF frequencies without risk of interception and monitoring by unauthorized persons.

The present preferred embodiment should be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A method for securing information carried by a composit video signal against unauthorized interception, the composit video signal including horizontal and vertical synchronizing pulses and equalizing pulses as well as a video component, said method comprising the step of transmitting the synchronizing and equalizing pulses in the form of a composite pulse train during recurring video blanking intervals, wherein said composite pulse train is characterized by a train of horizontal synchronizing pulses preceded by a group of vertical synchronizing pulses and first and second groups of equalizing pulses occurring immediately prior to and following the vertical pulse group, the pulses of the equalizing and vertical synchronizing groups each occurring at a plural multiple of the frequency of the horizontal pulses, the pulses of the vertical synchronizing group being relatively greater in amplitude as compared with the amplitudes of the horizontal synchronizing and equalization pulses, respectively, and the pulse width of each vertical synchronizing pulse being substantially less than the interval between successive vertical synchronizing pulses.

2. The method as defined in claim 1, wherein the pulse duration of the vertical synchronizing pulses is equal to the pulse duration of the equalizing pulses.

3. The method as defined in either claims 1 or 2 wherein the amplitude of the vertical synchronizing pulses is twice the amplitude of the horizontal synchronizing pulses.

4. The method as defined in claim 1, wherein the frequency of the vertical pulse group is twice the frequency of the horizontal pulses.

* * * * *